United States Patent
Söderquist et al.

(10) Patent No.: US 7,818,549 B2
(45) Date of Patent: Oct. 19, 2010

(54) EVENT DRIVEN DIGITAL SIGNAL PROCESSOR WITH TIME CONSTRAINTS

(75) Inventors: Ingemar Söderquist, Linköping (SE); Rolf Loh, Sturefors (SE)

(73) Assignee: SAAB AB (SE)

( * ) Notice: Subject to any disclaimer, the term of this patent is extended or adjusted under 35 U.S.C. 154(b) by 200 days.

(21) Appl. No.: 10/665,290

(22) Filed: Sep. 22, 2003

(65) Prior Publication Data
US 2004/0128491 A1 Jul. 1, 2004

(51) Int. Cl.
*G06F 1/14* (2006.01)
(52) U.S. Cl. ............... 712/224; 713/323; 713/401; 713/501
(58) Field of Classification Search ............ 712/244, 712/224; 713/401, 501
See application file for complete search history.

(56) References Cited

U.S. PATENT DOCUMENTS

| | | | | |
|---|---|---|---|---|
| 4,497,023 | A * | 1/1985 | Moorer | 712/205 |
| 5,220,676 | A * | 6/1993 | LoGalbo et al. | 455/503 |
| 5,517,628 | A * | 5/1996 | Morrison et al. | 712/234 |
| 5,768,602 | A * | 6/1998 | Dhuey | 713/322 |
| 5,826,072 | A * | 10/1998 | Knapp et al. | 712/226 |
| 5,913,058 | A * | 6/1999 | Bonola | 713/2 |
| 6,292,887 | B1 | 9/2001 | Janniello | |
| 6,308,197 | B1 | 10/2001 | Mason et al. | 709/102 |
| 6,567,839 | B1 | 5/2003 | Borkenhagen et al. | |
| 6,892,167 | B2 * | 5/2005 | Polan et al. | 702/187 |
| 2004/0088704 | A1 * | 5/2004 | Owen et al. | 718/100 |

OTHER PUBLICATIONS

Patterson, David. Hennessy, John. "Computer Archetecture: A Quantitative Approach". Morgan Kaufmann Publishers, Inc. 1996. pp. 278-282.*
Ixthos, Inc., *Overview of Real-Time Multiprocessing*, 1996.
Gerndt R. et al. "An event-driven multi-threading architecture for embedded systems"; Hardware/Sofware CoDesign, 1997. Proceedings of the Fifth International Workshop on Braunschweig, Germany Mar. 24-26, 1997 pp. 29-33.
Zoran Salcic, et al. "Reflex: A Processor Core for Reactive Embedded Applications"; Mainstream 12th International Conference; vol. 2438/2002, Sep. 2, 2002; pp. 945-954.
Baganne et al., "Hardware interface design for real time embedded systems" 1997. Proceedings. Seventh Great Lakes Symposium on Urbana-Champaign, IL Mar. 13-15, 1997.

* cited by examiner

*Primary Examiner*—Eddie P Chan
*Assistant Examiner*—Robert Fennema
(74) *Attorney, Agent, or Firm*—Venable LLP; Jeffri A. Kaminski

(57) ABSTRACT

The present invention relates to an event driven digital signal processor 1 comprising: a central arithmetical unit 5, a register 4, a controller 3, an instruction memory 2, and input/output devices. The instruction memory 2 is arranged to include time performance constraints and events. An event control unit 6 is arranged to recognize an event and to control processing to be carried out as a consequence of the event while fulfilling the time performance constraints. The controller 3 is arranged to suspend processing of the time performance constraints after initiating operations in the event control unit 6. The controller 3 resumes processing when advised by the event control unit 6.

8 Claims, 4 Drawing Sheets

EVENT DRIVEN DIGITAL SIGNAL PROCESSOR WITH TIME CONSTRAINTS

FIELD OF THE INVENTION

The present invention relates to a digital signal processor that is driven by events. The processor comprises a central arithmetical unit, a register, a controller, an instruction memory, and input/output devices.

DESCRIPTION OF PRIOR ART

Depending on the architecture of a digital signal processor, the same type of functionality can be performed quite differently. In control driven computing the basis is the predefined control procedure, stored as a program in machine code, describing in what sequence the information shall be processed. In a data driven architecture the processing unit in the computer operates only if all input data is present in an input buffer and enough space is available in the output buffer to store the result. In a demand driven architecture, execution is initiated by demand of output data. In an event driven architecture event and time is introduced. Each unit start processing immediately when input data arrive, recognized as detection of an input event. Events are conventionally handled in the operative system. Event driven processing is primarily used in reconfigurable systems with lower performance. The lower performance is a trade-off to the possibility to alter the behavior in the system by means of programming.

Compilers of today cannot map time or event expressed in software to lower level than the real-time operative system because time and event do not exist at the level below. The final execution of a single time or event expressed in the application software always ends up in the execution of a large number of machine code operations in sequence. This happens irrespective of computing architecture chosen for the application (control-, data-, demand- or event-driven). Consequently time performance for the final application is hard to guarantee because it is dependent of all simultaneous activities running on the processor and the real-time system. Achieved real-time performance is in general satisfying for mainstream applications, however it is too low real-time performance for more demanding applications. The consequence is that demanding applications cannot be implemented as a programmable application and executed on a digital signal processor.

Various real-time operative systems have been developed for the purpose of handling time and parallel processes. These systems provide a possibility of expressing time by means of a real-time operative system call to a real-time clock. The real-time operative system also allows event to effect the program by means of routines for interrupt. Data-, demand-, and event-driven programmable behavioral is always possible to use to implement the application software on top of a platform consisting of a real-time operative system and a traditional control driven computing architecture. However, the event driven processing by means of the operative system cannot be performed with sufficient time resolution for many high-speed applications, e.g., radar. For these types of applications, event-driven processing is particularly favorable since the function of these type of applications many times depend upon when a specific action is performed. This can easily be expressed in an event-driven architecture.

SUMMARY OF THE INVENTION

It is an object of the present invention to solve the problems in conventional event driven digital signal processors. This object is achieved through the digital signal processor in accordance with claim 1.

The event driven signal processor includes an arithmetic/logical unit, an internal register, a controller, an instruction memory and input/output devices as any conventional signal processor. The instruction memory is arranged to include time performance constraints and events.

The controller in the event driven signal processor in accordance with claim 1 is arranged to suspend further processing of time performance constraints after initiating operations in an event control unit connected to the processor. The event control unit is arranged to recognize an event and to control the processing to be carried out as a consequence of the event. All processing is carried out under the time performance constraints. The controller resumes processing when advised by the event control unit.

The invention also includes the specific embodiments disclosed in the dependent claims. In a preferred embodiment, two or more event control units are arranged in the processor. This allows the controller to proceed with processing of time performance constraints in one event control unit after initiating operations in another event control unit.

The event driven signal processor in accordance with the invention provides for a reconfigurable event driven signal processor, which handle time constraints in an elegant way. The performance of the processor may easily be predicted deterministically without any uncertainty caused by cache misses or interfering real-time operative system. The event driven processor is particularly suitable for high-speed applications, e.g., radar applications, routers or network processing.

DETAILED DESCRIPTION OF PREFERRED EMBODIMENTS

The preferred embodiments of the present invention will be described hereinafter with reference to the accompanying drawings.

Figure 1:
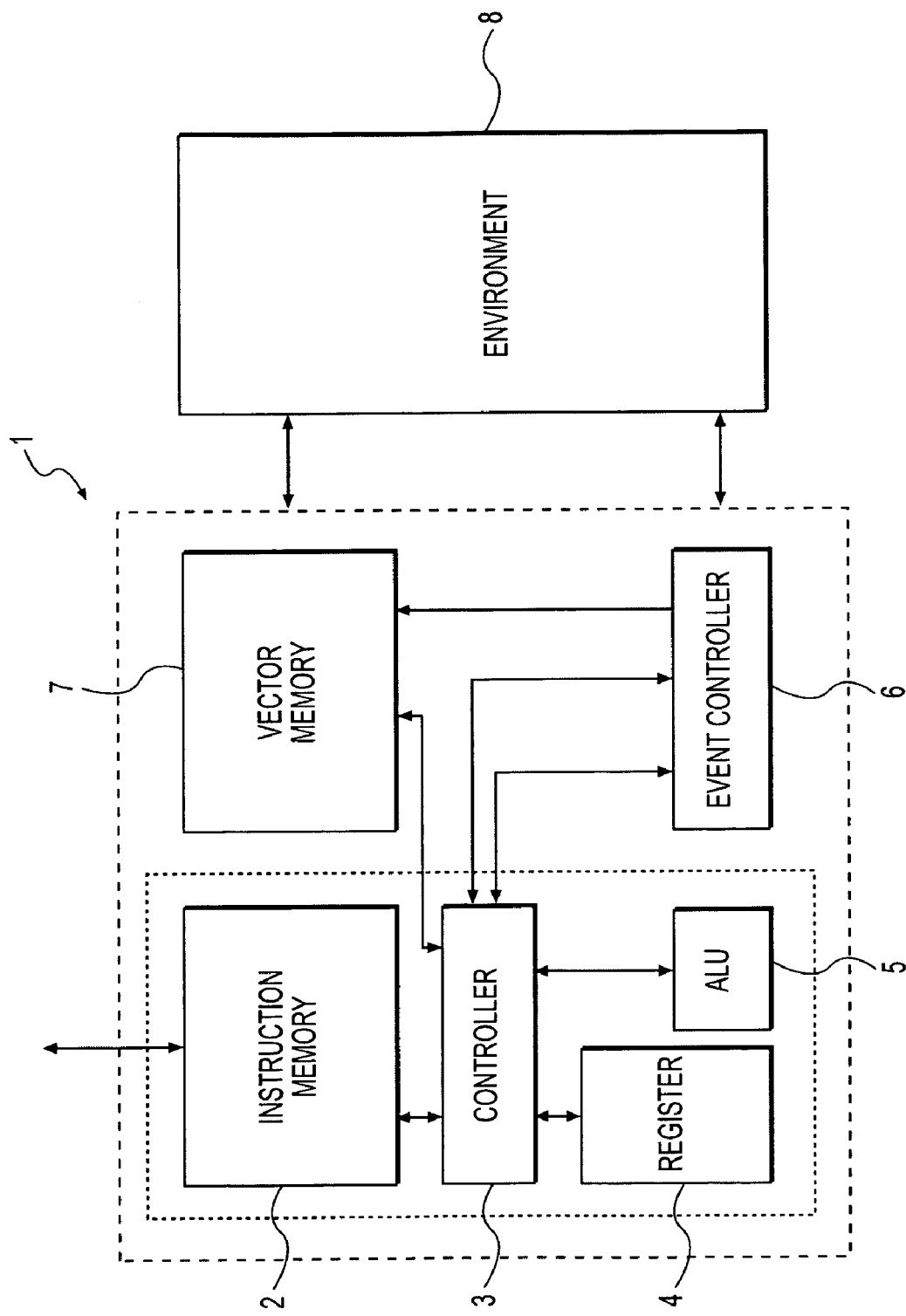
FIG. 1 discloses an architecture in a control driven processor extended to an event driven processing architecture in accordance with the invention FIG. 2 discloses the content of a one pulse package instruction FIG. 3 discloses the internal structure of an event control unit FIG. 4 discloses a block diagram of a second embodiment of an event driven processor FIG. 5 discloses a structure to implement high-resolution time delay

FIG. 1 discloses architecture for a first embodiment of an event driven processor 1 in accordance with the invention. The processor 1 is under control of a host processor, which is not disclosed in the figure. Input from the host processor is stored in the instruction memory 2. The processor 1 and the environment 8 form a real-time system. The instruction memory 2 holds operation code comprising logical operations as well as time constraints and events that will initiate operations within the processor 1. A signal memory 7, which can be a vector memory or any other suitable type of memory, stores signal data to be handled under the time-constraints in the processor 1. A controller 3 organizes reading and execution of the operation code in the instruction memory 2 so that everything is carried out in the correct sequence. Intermediate results are stored in a register 4 in conventional manner. An arithmetic and logical unit 5 is arranged to operate in a conventional manner. The processor 1 also includes an event control unit 6, which is capable of recognizing an event and to control the processing to be carried out as a consequence of the event while fulfilling the time performance constraints.

The controller 3 initiates operations in the event control unit 6. After initiating operation, the controller 3 suspends further processing of time performance constraints and awaits an alert from the event control unit 6. The event control unit 6 controls the vector memory 7 and defines access to the vector memory 7 so that data is extracted or stored at the right moment in time. When advised by the event control unit 6 following detection of an event, the controller 3 resumes processing by initiating a new operation in the event control unit 6. The event-driven behavior is expressed in the instruction memory 2 as a chain or sequence of events with associated actions. An action is defined as an achievement expected as a direct consequence of the event. Events are executed in direct sequence where a succeeding action is processed directly after a previous action is completed. Each event control unit 6 start processing immediately when input data arrive, recognized as detection of an input event. The computed result is presented at the output at a time defined by a corresponding time constraint. Input and output buffering is not required. The controller 3 is responsible for defining, through the event control unit 6, which part of the vector memory 7 that should be used for certain data. The event control unit 6 regulates when data is extracted or stored.

With the event driven processor 1 disclosed in FIG. 1, a vector memory 7 and an event control unit 6 allow events and time to be handled in the processor 1. With time constraints introduced in the processor 1, time critical functionality can be moved from the level above real-time operating system to the event control unit 6.

Figure 2:
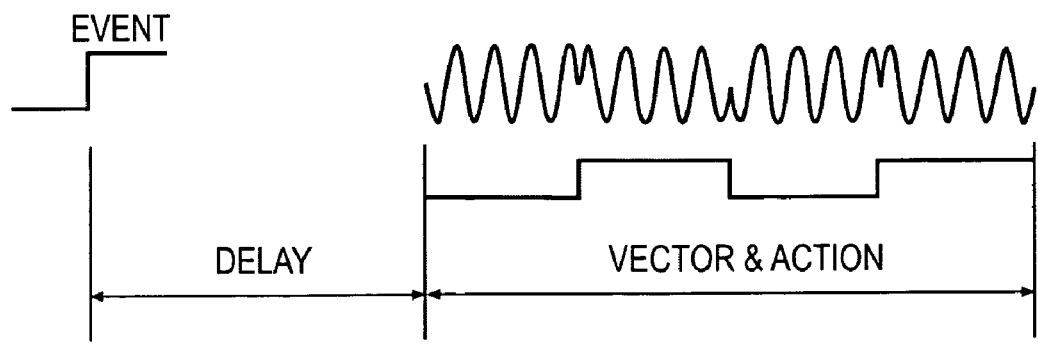

FIG. 2 discloses an example of a typical event. The action is phase modulation illustrated by the square wave affecting the extracted data. At machine instruction level event and time can be expressed as a pulse package operation with four operands: event, delay, vector and action.

Event is an operand that defines the event that initiate execution.

The delay operand defines a time constraint—a time interval to elapse between event and access to the vector memory 7 to extract or store data.

Vector is an operand that defines location in the vector memory 7.

The action operand defines future processing to be carried out on data after extraction or before storing in the vector memory 7.

Figure 3:
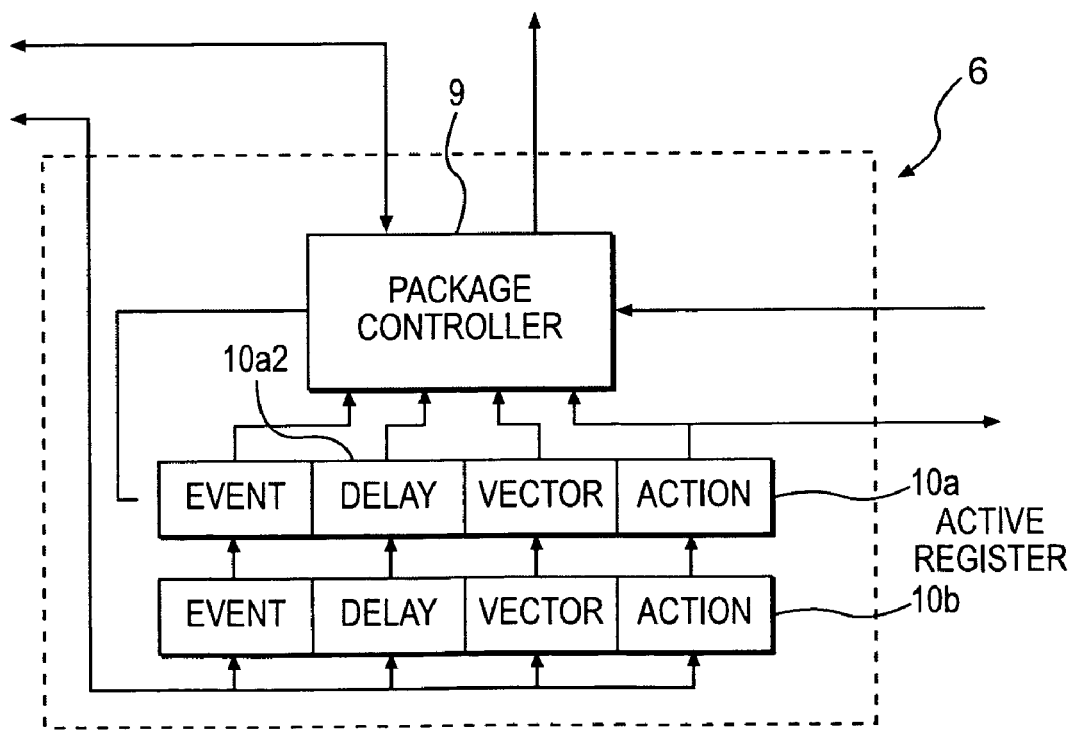

An event control unit 6 is disclosed in FIG. 3. The event control unit 6 includes a package controller 9, which is a combined controller and time counter; an interface to the vector memory 7 and to external devices; and registers 10a, 10b to hold operands for pulse packages to facilitate momentary switch. An active register 10a holds the pulse package that is in process or to be processed at the next event. A buffer register 10b holds the subsequent pulse package to facilitate momentary switch between two subsequent pulse packages. Each register 10a, 10b is subdivided into four fields, each holding one operand. The event operand in the registers 10a, 10b selects which external or internal event signal that should initiate the execution. The delay field contains the time constraint. The delay operand is used to define a stop condition for the counter in the package controller 9. The vector operand is used by the package controller 9 to define the start and end position for signal data in the vector memory 7. The action field interfaces with external devices to control activity in these devices. A signal from the package controller 9 controls transfer of new operands from the buffer register 10b to the active register 10a. Immediately after completion of the transfer, the package controller 9 will request new operands from the overlaying controller 3 using handshake signals. Execution of machine instructions in controller 3 is halted or resumed depending on the handshake signal.

Figure 4:
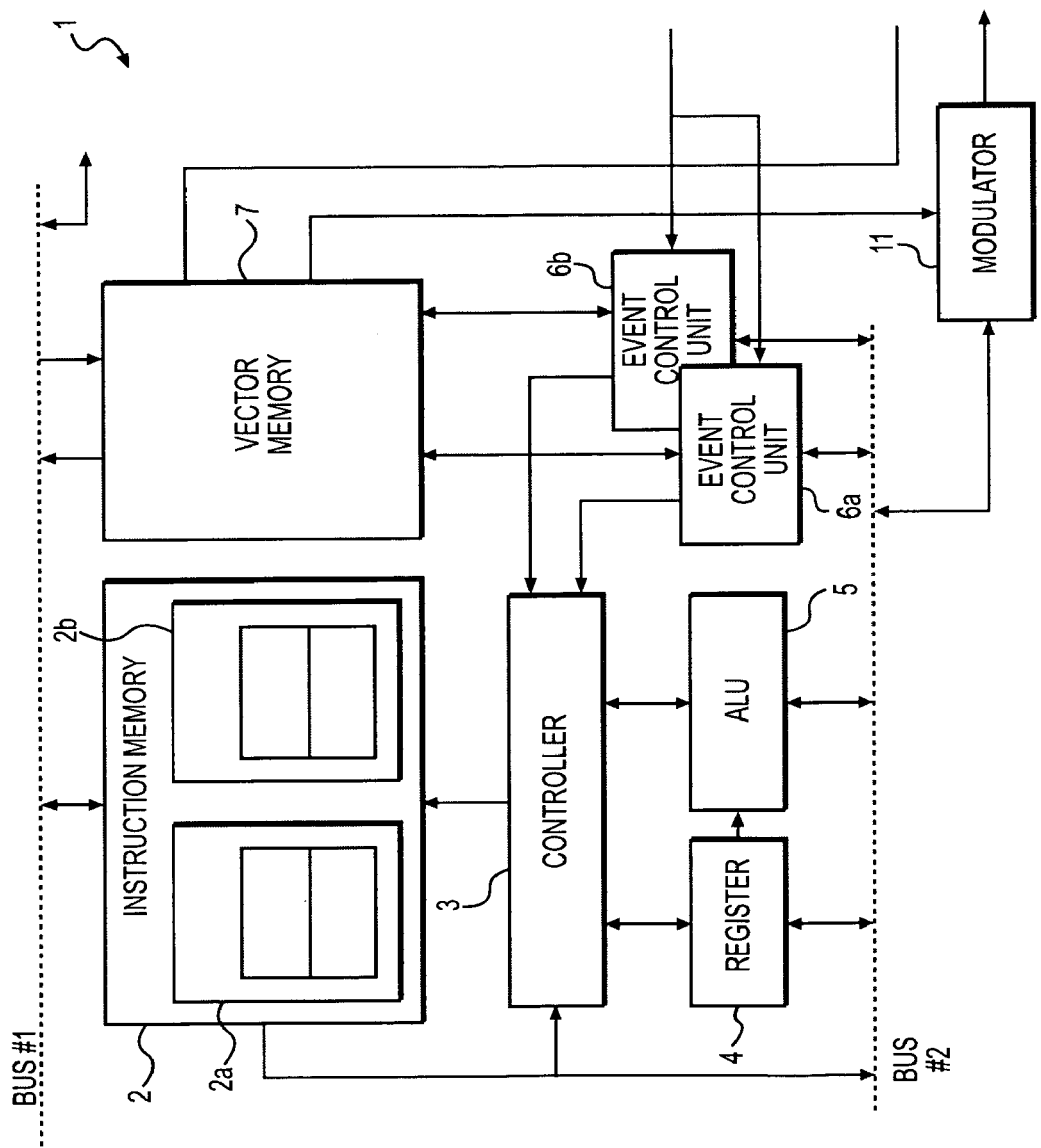

FIG. 4 shows a second embodiment of the architecture for an event driven processor 1. The processor 1 is placed between Bus #1, connecting to host processor, and Bus #2, passing parameters to event control units 6a, 6b and to external devices such as a modulator 11 included in the output data path. The instruction memory 2 has two logically separated parts 2a, 2b to enable update of the operation codes in the instruction memory 2 under processing. The controller 3 manages the execution of operation codes for the event control units 6a, 6b as stored in the instruction memory parts 2a, 2b as separate jobs. The vector memory 7 can be a four-port SRAM, where two ports are used for connection to data paths to external devices with simultaneous read and write. The other two ports are connected to Bus #1 for parallel signal analysis. The controller 3 manages the execution of operation codes needed for the two event control units 6a, 6b, one for receiver function and one for transmitter function. Operation codes for the two functions are stored as separate jobs in the instruction memory 2.

The event driven signal processor 1 is initialized by its host processor through Bus #1. The instruction memory 2 is loaded with code describing what actions to take when events arrive. The host processor starts an initial sequence of code to set up other hardware. The interconnection of the host processor and the event driven processor 1 by means of the instruction memory 2 enables a programmable behavior in the event driven processor 1. During updating of the instruction memory 2, updating is carried out within a first part 2a of the instruction memory 2, which is not involved in the execution of operation code. When the update has been terminated for the first part 2a, the execution of operation code is carried out from this first part 2a. Updating of the second part 2b is then initiated. After programming, a first initiation sequence is executed. After initiation, the event driven processor 1 suspends its processing and waits for an event to occur. When an event is detected, the pulse package operation stored in the active register 10a is executed. After execution of the pulse package is completed, the involved event control unit 6a/6b immediately initiates execution of the pulse package stored in the buffer register 10b. A request is sent to the controller 3 for new pulse packages. The request is accompanied by information of a job number, which is used by the controller 3 to resume execution of the corresponding job code in the instruction memory 2. When a job is processed, each instruction tells the controller 3 if it should continue, wait and then continue or wait and then restart. More than one event can be handled in parallel. Actions taken upon events are reconfigurable by updating the code in the instruction code area. A first part 2a is being executed while the second part 2b is updated from Bus #1. It is possible to update behavior for one job or more by using the logical separation in a first and second part 2a, 2b in the instruction memory 2. For example, while the first part 2a is updated from host processor, the second part 2*b* is used for event actions. Further signal processing of data from the vector memory 7 is controlled via bus #2 to the modulator 11.

Figure 5:
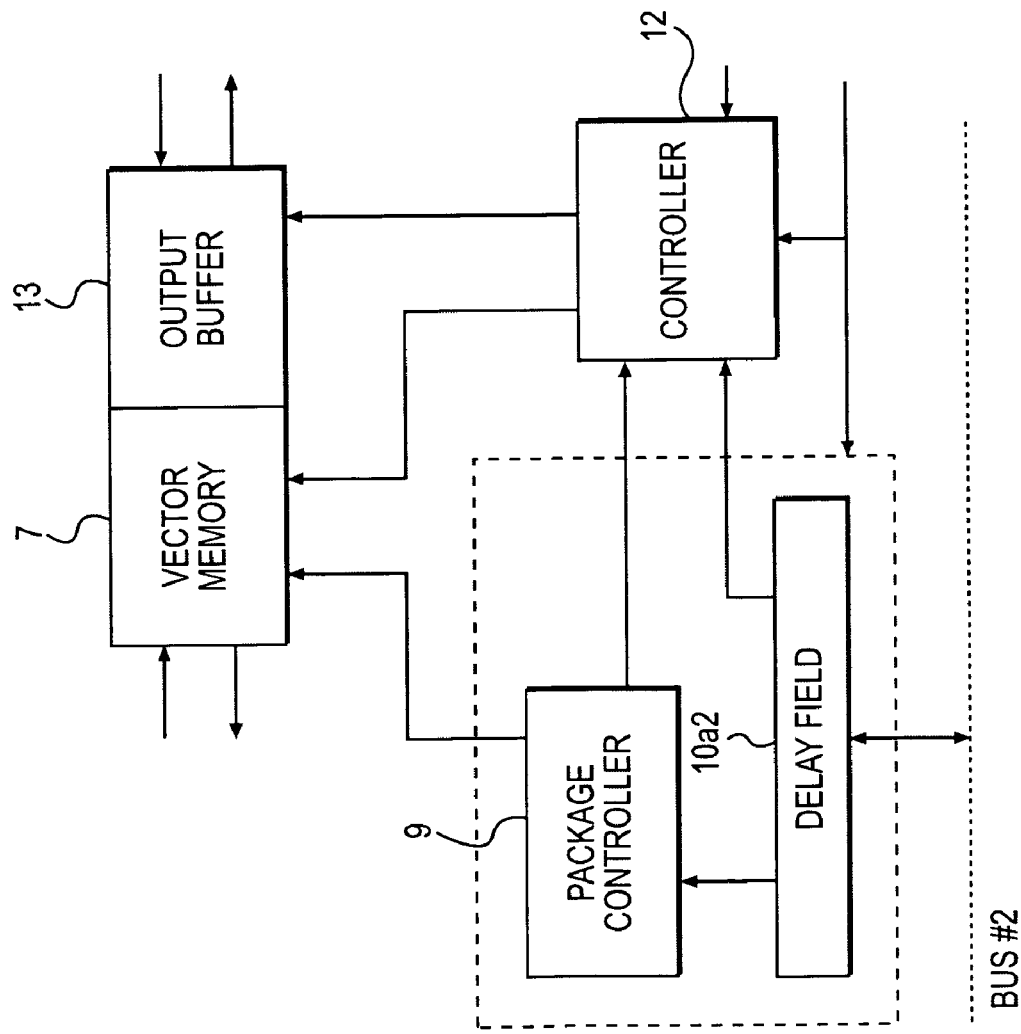

FIG. 5 shows a structure to implement high-resolution time delay.

High programmable time delay resolution is obtained by splitting the implementation of the delay field 10*a*2 in the active register 10*a* into two parts: a most significant part and a least significant part. The most significant part is passed to the package controller 9. A counter in the package controller 9 produces a delay as defined by the most significant part. Following the delay, data is extracted from the vector memory 7 and stored in an output buffer 13, which is part of the vector memory 7. The least significant part is passed to the high-speed controller 12 during the data extraction from the vector memory 7. A counter in the high-speed controller 12 produces a delay in a signal, which is passed from the package controller 9 to the high-speed controller 12 during data extraction from the vector memory 7. The high-speed controller 12 operates at the clock frequency and the counter in the package controller 9 operates at a lower frequency corresponding to the number of bits in the least significant part. Output data is stored in the buffer 13 until a signal: load_out_buffer, the delayed signal from the high-speed controller, becomes active. This signal is delayed as defined by the least significant part. Write is handled in a similar way.

The event driven processor 1 in accordance with the invention allows large data packages transmitted with high speed, e.g., radar signals, to be received, processed and retransmitted with a timing control down to nanoseconds.

The invention claimed is:

1. A digital signal processor comprising:
    an instruction memory, a central arithmetic unit, a register, a controller, an event control unit and input/output devices;
    the instruction memory is arranged to include one or more operation codes including logical operations, a delay operand and events;
    the controller is arranged to initiate operation of the event control unit in response to one of the one or more operation codes, suspend all further processing of the delay operand after initiating operations in an event control unit and resume processing when advised by the event control unit; and
    the event control unit is arranged to recognize an event and in response to the detection of the event execute a processing operation and initiate or resume processing of the controller upon completion of the processing operation, wherein the event is an input signal or a completion of processing from a previous event and the operation code comprises an event operand arranged to identify the input signal or previous event to initiate or resume processing of the event control unit and the delay operand executed by a counter in the event control unit, wherein the delay operand defines a time interval to elapse between the event and completion of the processing operation and a stop condition for the counter.

2. The digital signal processor in accordance with claim 1, wherein the event is detected by the event control unit.

3. The digital signal processor in accordance with claim 2, wherein the event control unit is arranged to detect input signals.

4. The digital signal processor in accordance with claim 2, wherein a further event is recognized as a completion of the processing carried out as a consequence of the event.

5. The digital signal processor in accordance with claim 1, wherein the event is recognized as a completion of the processing carried out as a consequence of a previous event.

6. The digital signal processor in accordance with claim 1, wherein the event control unit includes a signal memory arranged to store and extract data under control of the event control unit.

7. The digital signal processor in accordance with claim 6, wherein the signal memory is a vector memory.

8. The digital signal processor in accordance with claim 1, including two or more event control units arranged to work independently from each other.

\* \* \* \* \*